US009280407B2

(12) United States Patent  
Brodsky et al.

(10) Patent No.: US 9,280,407 B2  
(45) Date of Patent: Mar. 8, 2016

(54) PROGRAM DEVELOPMENT IN A DISTRIBUTED SERVER ENVIRONMENT

(71) Applicant: International Business Machines Corporation, Armonk, NY (US)

(72) Inventors: Stephen A. Brodsky, Los Gatos, CA (US); Anshul Dawra, San Jose, CA (US); Thomas Friedrich, San Jose, CA (US); Benjamin Nguyen, San Jose, CA (US); Robin M. Noble-Thomas, San Jose, CA (US); Rohit R. Thirumurthy, Santa Clara, CA (US); Sudarshan R. Thitte, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/254,418

(22) Filed: Apr. 16, 2014

(65) Prior Publication Data

US 2015/0301928 A1 Oct. 22, 2015

(51) Int. Cl.
| | | |
|---|---|---|
| G06F 9/44 | (2006.01) | |
| G06F 11/07 | (2006.01) | |
| G06F 11/36 | (2006.01) | |
| H04L 12/26 | (2006.01) | |

(52) U.S. Cl.  
CPC .............. *G06F 11/0709* (2013.01); *G06F 8/70* (2013.01); *G06F 8/71* (2013.01); *G06F 11/3688* (2013.01); *H04L 43/045* (2013.01); *H04L 43/10* (2013.01)

(58) Field of Classification Search  
IPC .................. G06F 2201/865,2201/87, 2201/875, G06F 2201/86, 19/00, 9/44, 9/46, 11/3404, G06F 11/368, 11/0709; H04L 41/0803, 41/1402, 41/22  
See application file for complete search history.

(56) References Cited

U.S. PATENT DOCUMENTS

| | | | |
|---|---|---|---|
| 7,051,316 B2 | 5/2006 | Charisius et al. | |
| 7,167,865 B1 | 1/2007 | Tharp et al. | |
| 7,840,943 B2 | 11/2010 | Volkov | |
| 8,516,175 B2 | 8/2013 | Alexander et al. | |
| 8,572,575 B2 | 10/2013 | Berlyant et al. | |
| 2004/0064552 A1* | 4/2004 | Chong et al. | 709/224 |
| 2006/0277528 A1* | 12/2006 | Chen et al. | 717/124 |

(Continued)

OTHER PUBLICATIONS

List of IBM Patents or Patent Applications Treated As Related, Mar. 12, 2015.

(Continued)

*Primary Examiner* — Tuan Vu  
(74) *Attorney, Agent, or Firm* — Anthony England; Edell, Shapiro & Finnan, LLC

(57) ABSTRACT

According to one embodiment of the present invention, a system for processing a computer program for a distributed server environment executes the computer program in the distributed server environment in accordance with a configuration for the computer program. The computer program is generated within a development environment. The configuration indicates a type of server environment and is associated with one or more data sets for processing by the computer program. The system monitors execution of the computer program within the distributed server environment and provides a program status to the development environment. The system displays results produced by the computer program within the distributed server environment via the development environment. Embodiments of the present invention further include a method and computer program product for processing a computer program in substantially the same manners described above.

14 Claims, 3 Drawing Sheets

(56) References Cited

U.S. PATENT DOCUMENTS

| | | | |
|---|---|---|---|
| 2010/0179940 A1* | 7/2010 | Gilder et al. | 707/622 |
| 2010/0281458 A1* | 11/2010 | Paladino et al. | 717/106 |
| 2011/0078666 A1 | 3/2011 | Altekar | |
| 2012/0254292 A1 | 10/2012 | Newton et al. | |
| 2012/0254722 A1 | 10/2012 | Newton et al. | |
| 2013/0152047 A1* | 6/2013 | Moorthi et al. | 717/124 |
| 2013/0204948 A1 | 8/2013 | Zeyliger et al. | |
| 2013/0297973 A1* | 11/2013 | Hyland et al. | 714/27 |
| 2014/0149576 A1* | 5/2014 | Pavlov et al. | 709/224 |
| 2014/0289738 A1* | 9/2014 | Paliwal et al. | 719/311 |

OTHER PUBLICATIONS

U.S. Appl. No. 14/643,328, filed Mar. 10, 2015.

Tan et al., "Mochi: Visual Log-Analysis Based Tools for Debugging Hadoop." Proceedings of the 2009 Conference on Hot Topics in Cloud Computing. USENIX Association, 2009.

\* cited by examiner

PROGRAM DEVELOPMENT IN A DISTRIBUTED SERVER ENVIRONMENT

BACKGROUND

Present invention embodiments relate to a program development environment for distributed computing systems, and more specifically, to a development life cycle that comprises testing a program on a distributed server from within an integrated development environment (IDE).

Program development generally comprises multiple steps that are performed multiple times until a program is finalized. Developers write code in a programming language, execute the program to process one or more input data sets, compare the output of the program to expected output, make changes to the program, and eventually debug the program line by line, until the output of the program matches the expected output.

Typically, developers use an integrated development environment (IDE) (e.g., Eclipse, NETBEANS®, VISUAL STUDIO®, etc.) to write and run programs on local computing systems. Some tools allow programs to be run in a server environment. For example, the Eclipse web tools platform (WTP) provides the capability to register a web server in the Eclipse environment and to dynamically deploy and run web applications on the web server directly from Eclipse. However, existing tools do not run programs in a distributed server environment, retrieve results, and compare the results against expected output.

SUMMARY

According to one embodiment of the present invention, a system for processing a computer program for a distributed server environment executes the computer program in the distributed server environment in accordance with a configuration for the computer program. The computer program is generated within a development environment. The configuration indicates a type of server environment and is associated with one or more data sets for processing by the computer program. The system monitors execution of the computer program within the distributed server environment and provides a recurrently refreshed program status to the development environment. The system displays results produced by the computer program within the distributed server environment via the development environment. Embodiments of the present invention further include a method and computer program product for processing a computer program in substantially the same manners described above.

BRIEF DESCRIPTION OF THE SEVERAL VIEWS OF THE DRAWINGS

Generally, like reference numerals in the various figures are utilized to designate like components.

DETAILED DESCRIPTION

Present invention embodiments relate to a development life cycle for programs for a distributed server environment (e.g., a computer cluster using the HADOOP® framework, a grid computing system, etc.). In one embodiment, the steps of the development cycle may be performed within an integrated development environment (IDE). A configuration is generated to specify the artifacts (e.g., program files, runtime libraries, control parameters, etc.) of a program and the type of distributed server environment in which the program is to run. The IDE may copy the program to a distributed server and bring the results (e.g., output data, log files, etc.) back. The results may be viewed and compared to other results within the IDE. The configuration may be saved and shared across instances of distributed server environments (e.g., development system, production system, etc.).

One aspect of a present invention embodiment is that a user may run programs on remote computing systems and visualize the results without having to switch between the IDE and interfaces to the distributed server systems. Another aspect is that the user may visualize results of jobs that are run on different nodes of a distributed server and retrieve job and log information of the job execution from different nodes that can be used to troubleshoot or debug the job. Since results and log information may be brought in to the client, the user may visualize and compare results without having to connect to each node.

Figure 1:
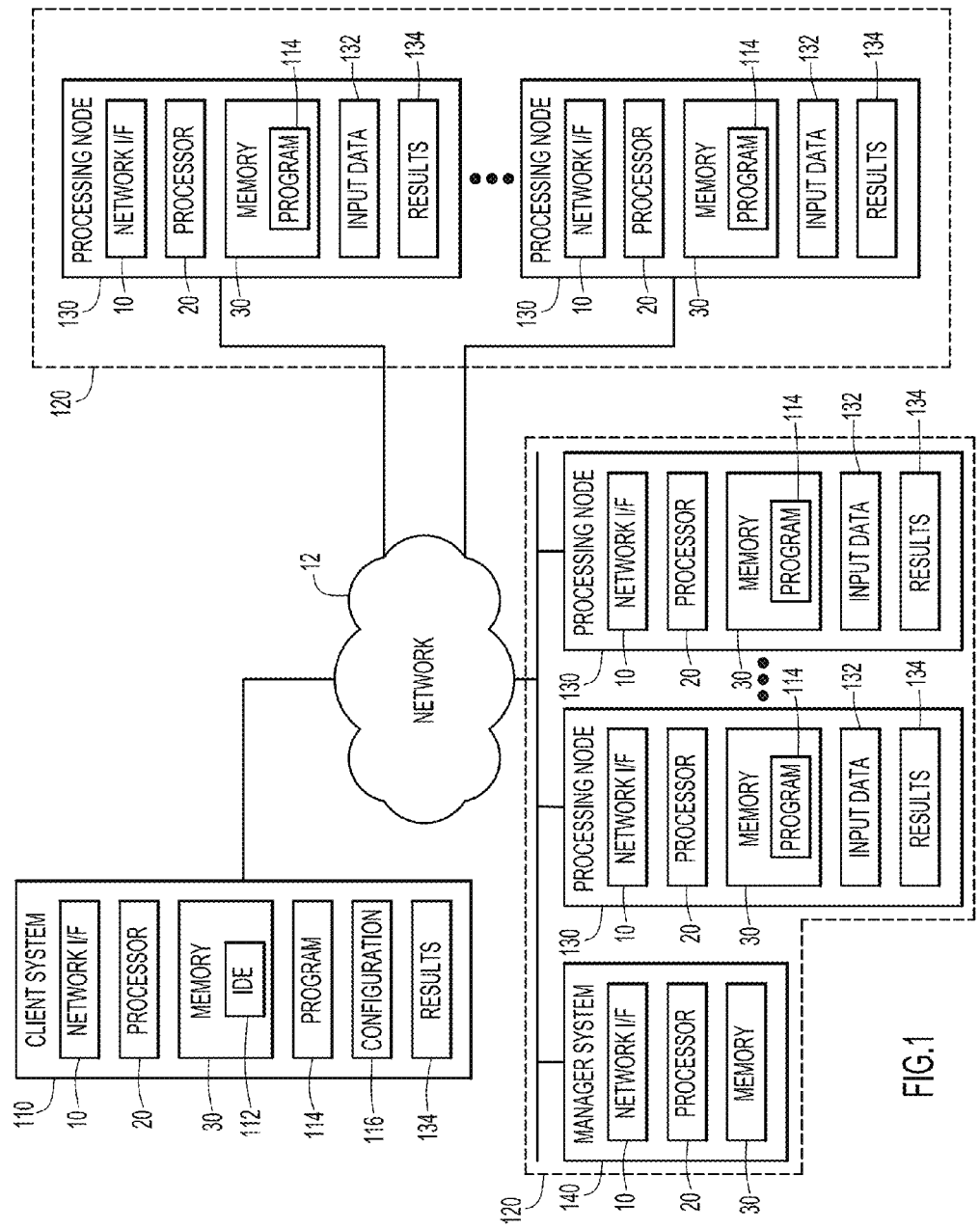
FIG. 1 is a diagrammatic illustration of an example environment for an embodiment of the present invention.

An example environment for present invention embodiments is illustrated in FIG. 1. Specifically, the environment includes one or more client or end-user systems 110 and one or more distributed servers 120. A distributed server 120 comprises processing nodes 130 and may include a manager system 140. For example, distributed server 120 may be a computer cluster using a distributed processing framework (e.g., the HADOOP® framework, a distributed relational database manager, etc.). Client systems 110, distributed servers 120, processing nodes 130, and manager systems 140 may be remote from each other and communicate over a network 12. Network 12 may be implemented by any number of any suitable communications media (e.g., wide area network (WAN), local area network (LAN), Internet, intranet, etc.). Alternatively, any number of client systems 110, distributed servers 120, processing nodes 130, and/or manager systems 140 may be local to each other, and communicate via any appropriate local communication medium (e.g., local area network (LAN), hardwire, wireless link, intranet, etc.).

Client system 110 may submit a program 114 to run on one or more of the processing nodes 130 of a distributed server 120. In one embodiment of the present invention, client system 110 submits program 114 to the distributed server via manager system 140. The manager system distributes the program to one or more processing nodes (e.g., based on the nodes' proximity to portions of the program's input data 132), and may combine results from separate nodes. Alternatively, client system 110 may submit a program directly to one or more processing nodes 130. Input data 132 for the program and results 134 of running the program may reside locally or remotely to processing nodes 130.

Client system 110 includes an integrated development environment (IDE) 112. The IDE may be implemented across plural computing systems. Alternatively, the IDE may reside on a processing node 130, manager system 140, or other computer system in communication with a distributed server. The IDE may present any graphical user (e.g., GUI, etc.) or other interface (e.g., command line prompts, menu screens, etc.) to receive commands from and display information to users, build one or more programs 114 and configurations 116, and submit programs 114 to manager system 140 and/or processing nodes 130 of distributed server 120.

Server systems 120 and client systems 130 may be implemented by any conventional or other computer systems preferably equipped with a display or monitor, a base (e.g., including at least one processor 20, memories 30 and/or internal or external network interface or communications devices 10 (e.g., modem, network cards, etc.), optional input devices (e.g., a keyboard, mouse, or other input device), and any commercially available and custom software (e.g., index software, database software, etc.).

The IDE may include one or more modules or units to perform the various functions of present invention embodiments described below (e.g., building programs, generating configurations 116, submitting jobs to a distributed server system, monitoring remote program execution, retrieving results, displaying results, etc.), may be implemented by any combination of any quantity of software and/or hardware modules or units, and may reside within memory 30 of a server system and/or client systems for execution by processor 20. For example, functions of present invention embodiments may be implemented as one or more add-ons or plug-ins to an extensible IDE (e.g., Eclipse). Alternatively, a present invention embodiment may be implemented as an integrated IDE application.

Figure 2:
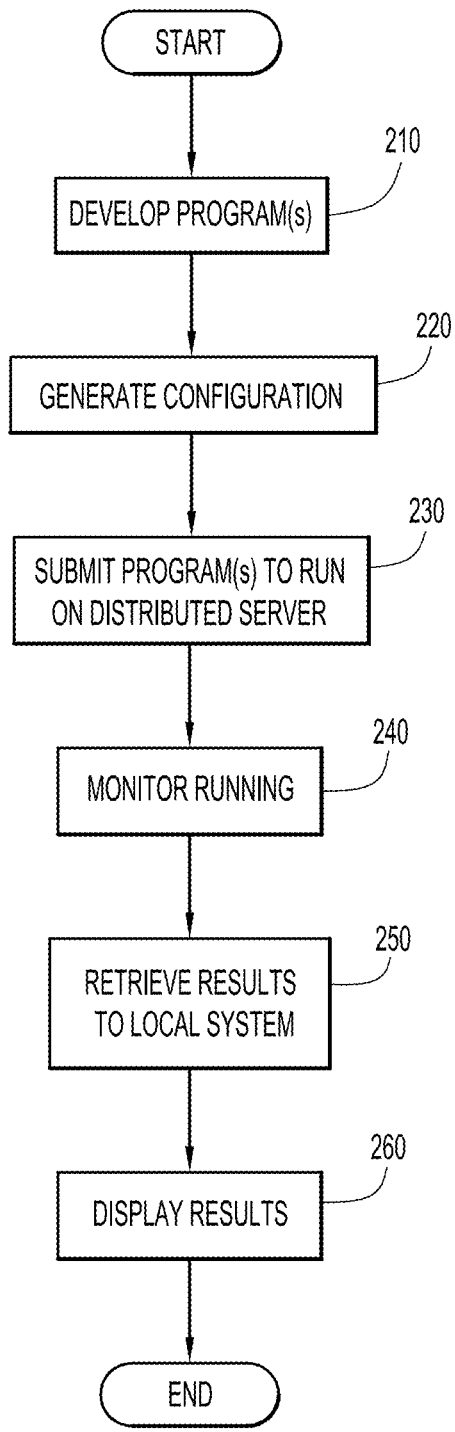
FIG. 2 is a flow diagram illustrating an example manner of performing an iteration of the development lifecycle for a distributed program according to an embodiment of the present invention.

An example manner of performing an iteration of the development lifecycle for a distributed program according to an embodiment of the present invention is illustrated in FIG. 2. In particular, at step 210, IDE 112 receives source code (e.g., new or revised source code entered by a user via a text editor of the IDE) for a program 114 to be run on a distributed server 120. The IDE may build (e.g., compile, link, generate byte code, etc.) program 114 based on the received source code. Alternatively, program 114 may be in the form of instructions to be interpreted or compiled on processing nodes 130 and/or manager system 140.

At step 220, the IDE generates configuration 116 based on user input. Configuration 116 includes a specification of the artifacts of the program (e.g., the program files, libraries, control parameters, options, or any other information required by the program during execution) and a definition of a server environment in which the program will be run. The configuration may be persisted and used to submit and run the program repeatedly.

The definition of the server environment may indicate credentials to be used to log on to the server environment, a location at which to store output of the program, locations of one or more input data sets, and the like. Alternatively, the definition of the server environment may reside outside configuration 116 and may be associated (e.g., by a user via the IDE) with a configuration 116 for a particular run. This enables a user to easily share a program configuration across different server environments by simply associating the configuration with a different definition of a server environment definition for a different run.

The configuration may specify any number of sets of input data 132. A data set is a collection of data that the program uses as input data. If multiple data sets are defined as part of one configuration, the program will be run against each data set separately and store the result for each data set separately. Alternatively, input data sets may be specified externally to a configuration, and the user may associate the input data sets with the configuration for a particular run.

At step 230, the IDE receives an instruction from the user to initiate a run of the program on a distributed server as specified in the configuration. In response, the IDE packages the artifacts of the program identified in the configuration, and sends the package to the distributed server. For example, the IDE may send the package to a single interface of the server, e.g., on a manager system 140 or a selected processor node 130 that distributes the job to processor nodes for execution. Alternatively, the IDE may send the package directly to individual processor nodes. Once the package is received successfully by the distributed server, the IDE may send a message to the server (or to individual processor nodes) to trigger execution of the run of the program. In response, the server runs the program in the manner specified in the configuration. The processor nodes may spawn processes for the run, create directories and control files, set environment variables, load program files and runtime libraries, import remote input data, and begin program execution as directed by the configuration 116 and any associated information.

While the program is running, the progress of the run may be monitored and reported back to IDE, which may display the run progress to the user. For example, the distributed server may track the progress of the run and provide an interface for a client system to access run progress information (e.g., by exchanging messages). Existing distributed server environments generally provide this capability. The IDE may periodically poll the distributed server via the interface to retrieve run status information. In an alternative embodiment, processing nodes 130 and/or manager system 140 push run status messages to the client system.

After the run of the program completes, the results of the run may be automatically copied or moved from distributed server system 120 to client system 110 at step 240. For example, the IDE may copy the results to client system 110 from the output destination specified in the definition of the server environment. In addition, the IDE may import (e.g., in response to a user command via the IDE) other information (e.g., log information from logs 126) from the cluster environment to the client system. In one embodiment of the present invention, the IDE retrieves results, logs, and/or run progress messages through a defined interface of the distributed server, which internally collects all the information from the nodes of the distributed server environment. In this embodiment, a user need not provide access credentials to the processing nodes in order to retrieve results, logs, or other information associated with particular processing nodes. In another embodiment, the IDE may retrieve information directly from individual processing nodes. In still another embodiment, the processing nodes 130 and/or manager system 140 copy results to the client system once the run completes.

At step 250, the results received at the client may be visualized in the IDE using an appropriate visualizer for the type of data (e.g., plain text files may be displayed as unstructured text, relational database tuples may be displayed in tabular format, etc.). The IDE may provide a selection of generic text and/or graphical visualization tools (e.g., to display histograms, line charts, scatterplots, etc.). In addition, the IDE may provide custom visualizations (e.g., to display results of a specific program or family of programs). The results may be compared to reference results. If the program was run against multiple data sets, the corresponding results may be compared within the IDE to assess the quality and/or consistency of the program for the different input data sets. In addition, the IDE may display one or more logs (e.g., to analyze problems that happened during the program run).

According to an embodiment of the present invention, two or more different programs may be submitted and run together on distributed server environment 120. A user may combine two or more configurations or reference two or more programs in one configuration. For example, two or more programs may be run sequentially, where output of one of the programs is input to another. The IDE may coordinate launching of the programs on the distributed server based on the configuration(s).

Figure 3:
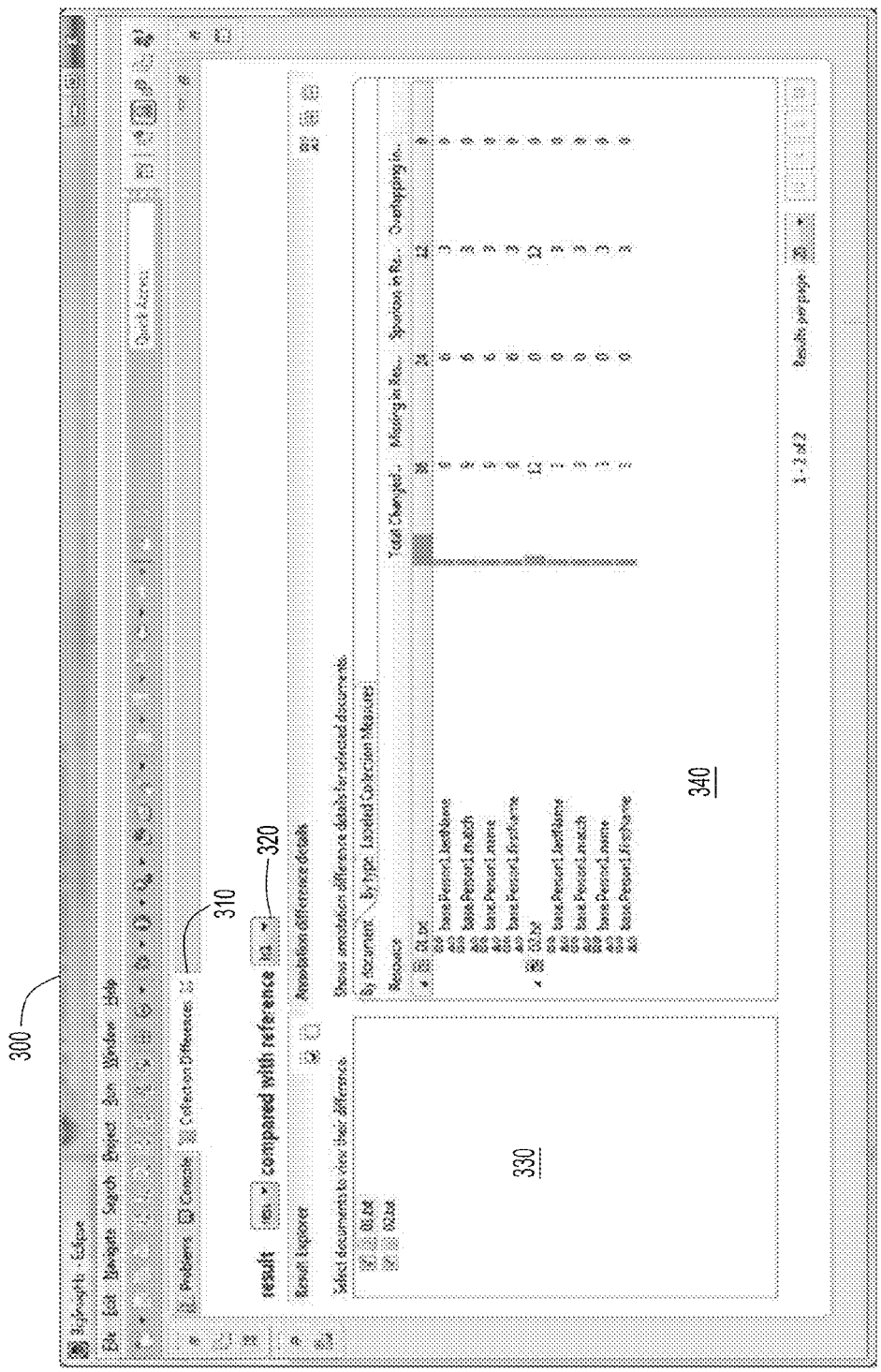
FIG. 3 is a screenshot depicting an example interface for visualizing results of a distributed program within an IDE according to an embodiment of the present invention.

A screenshot depicting an example interface for visualizing results of a distributed program within an IDE according to an embodiment of the present invention is illustrated in FIG. 3. By way of example, the distributed program may identify instances of persons first and last names within the input data and produce a text file containing the results. The IDE may provide visualizations of the results described in the text file. In particular, window 300 of IDE 112 includes a tab 310 to select visualizations to compare results of different runs and to compare results of the runs with reference results. The reference results are selected by drop-down menu 320. Check box 330 lists files 01.txt and 02.txt, containing the results of runs 01 and 02 of the program, respectively. Information about differences of the results of each file selected within check box 330 with respect to the reference results (e.g., total differences, number of items present in the reference results but missing in the run results, number of spurious items present in the run results, etc.) are displayed in table 340.

It will be appreciated that the embodiments described above and illustrated in the drawings represent only a few of the many ways of implementing embodiments for processing a computer program for a distributed server environment.

The environment of the present invention embodiments may include any number of computer or other processing systems (e.g., client or end-user systems, server systems, etc.) and storage systems (e.g., file systems, databases, or other repositories), arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., database software, communications software, etc.). These systems may include any types of monitors and input devices (e.g., keyboard, mouse, voice recognition, touch screen, etc.) to enter and/or view information.

It is to be understood that the software of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, intranet, etc.).

The system may employ any number of any conventional or other databases, data stores or storage structures (e.g., files, databases, data structures, data or other repositories, etc.) to store information. The database system may be implemented by any number of any conventional or other databases, data stores or storage structures (e.g., files, databases, data structures, data or other repositories, etc.) to store information. The database system may be included within or coupled to the server and/or client systems. The database systems and/or storage structures may be remote from or local to the computer or other processing systems, and may store any desired data.

The present invention embodiments may employ any number of any type of user interface (e.g., Graphical User Interface (GUI), command-line, prompt, etc.) for obtaining or providing information, where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The present invention embodiments are not limited to the specific tasks or algorithms described above, but may be utilized for processing any type of program (e.g., database application, indexing, data mining, etc.) on any type of remote processing system (e.g., HADOOP cluster, distributed web server, relational database server, etc.).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A system for processing a computer program in a distributed server environment comprising:
 a development environment comprising at least one processor and a memory configured to:
  generate a computer program and configuration information associated with one or more data sets for processing by the computer program, wherein the configuration information includes:
   a specification of artifacts of the computer program, and
   a definition of a distributed server environment to execute the computer program comprising credentials to access the distributed server environment and storage location information defined within the configuration information, wherein the storage location information includes storage locations for one or more input data sets and at least one storage location at which the results produced by the computer program are stored;
  submit the computer program and the configuration information to a distributed server system to execute the computer program in the distributed server environment in accordance with the configuration information;
  receive a program status from the distributed server system comprising information about a state of execution of the computer program and the results produced by the computer program within the distributed server environment; and
  identify errors of the computer program by comparing results produced by one or more program runs within the distributed server environment.

2. The system of claim 1, wherein the distributed server environment provides the program status to the development environment in response to the development environment polling the distributed server environment.

3. The system of claim 1, wherein the development environment imports the results produced by the computer program to a client system.

4. The system of claim 1, wherein displaying the results further comprises:
 displaying the results based on a type of data within the results.

5. The system of claim 1, wherein the at least one first processor and the first memory are further configured to:
 retrieve one or more logs of information from the distributed server environment pertaining to execution of the computer program for display in the development environment.

6. The system of claim 1, wherein the configuration information is associated with a plurality of computer program units, and wherein:
 executing the computer program further comprises:
  executing the plurality of computer program units in the distributed server environment in accordance with the configuration information;
 monitoring execution of the computer program further comprises:
  monitoring execution of the plurality of computer program units within the distributed server environment and providing a program status for each computer program unit to the development environment; and
 displaying results further comprises:
  displaying results produced by the plurality of computer program units within the distributed server environment via the development environment.

7. The system of claim 1, wherein the distributed server system is a cluster using a distributed processing framework, wherein the cluster comprises a manager system and at least two processing nodes, and
 wherein the manager system:
  distributes the computer program to the at least two processing nodes, and
  combines results from the at least two processing nodes.

8. A computer program product for processing a computer program in a distributed server environment comprising:
 a non-transitory computer readable storage medium having computer readable program code embodied therewith for execution on a processing system, the computer readable program code comprising computer readable program code configured to:
 generate a computer program and configuration information associated with one or more data sets for processing by the computer program, wherein the configuration information includes:
  a specification of artifacts of the computer program, and
  a definition of a distributed server environment to execute the computer program comprising credentials to access the distributed server environment and storage location information defined within the configuration information, wherein the storage location information includes storage locations for one or more input data sets and at least one storage location at which the results produced by the computer program are stored;
 submit the computer program and the configuration information to a distributed server system to execute the computer program in the distributed server environment in accordance with the configuration information;
 receive a program status from the distributed server system comprising information about a state of execution of the computer program and the results produced by the computer program within the distributed server environment; and
 identify errors of the computer program by comparing results produced by one or more program runs within the distributed server environment in the first memory.

9. The computer program product of claim 8, wherein the distributed server environment provides the program status to the development environment in response to the development environment polling the distributed server environment.

10. The computer program product of claim 8, wherein the development environment imports the results produced by the computer program to a client system.

11. The computer program product of claim 8, wherein displaying the results further comprises:

displaying the results based on a type of data within the results.

12. The computer program product of claim 8, wherein the computer readable program code is further configured to:
   retrieve one or more logs of information from the distributed server environment pertaining to execution of the computer program for display in the development environment.

13. The computer program product of claim 8, wherein the configuration information is associated with a plurality of computer program units, and wherein:
   executing the computer program further comprises:
      executing the plurality of computer program units in the distributed server environment in accordance with the configuration information;
   monitoring execution of the computer program further comprises:
      monitoring execution of the plurality of computer program units within the distributed server environment and providing a program status for each computer program unit to the development environment; and
   displaying results further comprises:
      displaying results produced by the plurality of computer program units within the distributed server environment via the development environment.

14. The computer program product of claim 8, wherein the distributed server system is a cluster using a distributed processing framework,
   wherein the cluster comprises a manager system and at least two processing nodes, and
   wherein the manager system:
      distributes the computer program to the at least two processing nodes, and combines results from the at least two processing nodes.

* * * * *